(12) United States Patent
Murata et al.

(10) Patent No.: US 8,736,958 B2
(45) Date of Patent: May 27, 2014

(54) DIFFRACTIVE OPTICAL ELEMENT

(75) Inventors: Akiko Murata, Osaka (JP); Yuka Okada, Hyogo (JP)

(73) Assignee: Panasonic Corporation, Osaka (JP)

( * ) Notice: Subject to any disclaimer, the term of this patent is extended or adjusted under 35 U.S.C. 154(b) by 563 days.

(21) Appl. No.: 12/988,535

(22) PCT Filed: Feb. 22, 2010

(86) PCT No.: PCT/JP2010/001121
§ 371 (c)(1),
(2), (4) Date: Oct. 19, 2010

(87) PCT Pub. No.: WO2010/098055
PCT Pub. Date: Sep. 2, 2010

(65) Prior Publication Data
US 2011/0038050 A1      Feb. 17, 2011

(30) Foreign Application Priority Data

Feb. 25, 2009   (JP) .................... 2009-041828

(51) Int. Cl.
*G02B 5/18*    (2006.01)
*G02B 27/42*   (2006.01)

(52) U.S. Cl.
CPC .......... *G02B 27/4211* (2013.01); *G02B 5/1814* (2013.01)
USPC ........................................ 359/576

(58) Field of Classification Search
USPC ................................ 359/566–576
See application file for complete search history.

(56) References Cited

U.S. PATENT DOCUMENTS

| 6,157,488 | A | 12/2000 | Ishii |
| 6,781,756 | B1 | 8/2004 | Ishii |
| 2004/0263982 | A1 | 12/2004 | Ishii |
| 2006/0024521 | A1* | 2/2006 | Everaerts et al. ............. 428/522 |
| 2006/0171031 | A1 | 8/2006 | Suzuki |
| 2007/0097314 | A1* | 5/2007 | Wimberger-Friedl et al. ................... 351/159 |
| 2008/0094712 | A1 | 4/2008 | Miyakawa |
| 2009/0180186 | A1 | 7/2009 | Ando et al. |
| 2010/0134888 | A1* | 6/2010 | Korenaga et al. ............. 359/576 |

FOREIGN PATENT DOCUMENTS

| JP | 63-237011 | 10/1988 |
| JP | 09-127322 | 5/1997 |
| JP | 10-095967 | 4/1998 |
| JP | 10-268116 | 10/1998 |
| JP | 2005-107298 | 4/2005 |
| WO | 2006/068137 A1 | 6/2006 |
| WO | 2007/026597 A1 | 3/2007 |

OTHER PUBLICATIONS

International Search Report for corresponding International Application No. PCT/JP2010/001121 mailed Mar. 23, 2010.

* cited by examiner

*Primary Examiner* — Stephone B Allen
*Assistant Examiner* — Jeffrey Madonna
(74) *Attorney, Agent, or Firm* — Renner, Otto, Boisselle & Sklar, LLP

(57) ABSTRACT

A diffractive optical element according to the present invention includes: a body 1 being composed of a first optical material containing a first resin, and having a diffraction grating 2 on a surface thereof; and an optical adjustment layer 3 being composed of a second optical material containing a second resin, and provided on the body so as to cover the diffraction grating. A difference between a solubility parameter of the first resin and a solubility parameter of the second resin is 0.8 $[cal/cm^3]^{1/2}$ or more, and the first resin and the second resin each have a benzene ring.

9 Claims, 6 Drawing Sheets

(a)

(b)

(c)

(a)

(b)

(c)

(d)

DIFFRACTIVE OPTICAL ELEMENT

TECHNICAL FIELD

The present invention relates to a diffractive optical element, and relates to a diffractive optical element composed of two or more members of different resins.

BACKGROUND ART

A diffractive optical element is structured so that a diffraction grating for diffracting light is provided on a body which is composed of an optical material such as a glass or a resin. Diffractive optical elements are used in the optical systems of various optical devices, including imaging devices and optical recording apparatuses. For example, lenses which are designed to gather diffracted light of a specific order to one point, spatial low-pass filters, polarizing holograms, and the like are known.

A diffractive optical element has an advantage in that it allows for a compact optical system. Moreover, conversely to refraction, a greater diffraction occurs for light of longer wavelengths. Therefore, by combining a diffractive optical element and a usual optical element which utilizes refraction, it is possible to improve the chromatic aberration and curvature of field of an optical system.

However, since diffraction efficiency theoretically depends on light wavelength, there is a problem in that, if a diffractive optical element is designed so as to attain an optimum diffraction efficiency for light of a specific wavelength, its diffraction efficiency will be lower for light of any other wavelength. For example, in the case where a diffractive optical element is employed in an optical system which utilizes white light, e.g., a lens for a camera, such wavelength dependence of diffraction efficiency will cause uneven color and flares due to light of unwanted orders, and thus it is difficult to construct an optical system having appropriate optical characteristics with diffractive optical elements alone.

Against such problems, Patent Document 1 discloses a method of constructing a phase-difference type diffractive optical element, where a diffraction grating is provided on the surface of a body that is composed of an optical material, the diffraction grating being covered with an optical adjustment layer which is composed of an optical material different from that of the body, and by selecting two optical materials so that their optical characteristics satisfy predetermined conditions, the diffraction efficiency at a designed order of diffraction is increased regardless of the wavelength; that is, the wavelength dependence of diffraction efficiency is reduced.

Assuming that the light which is transmitted through the diffractive optical element has a wavelength $\lambda$; refractive indices of the two types of optical materials at the wavelength $\lambda$, are $n1(\lambda)$ and $n2(\lambda)$; and the diffraction grating has a depth d, then the diffraction efficiency with respect to light of the wavelength $\lambda$, will be 100% when eq. (1) below is satisfied.

[Eq. 1]

$$d = \frac{\lambda}{|n1(\lambda) - n2(\lambda)|} \quad (1)$$

Therefore, in order to reduce the wavelength dependence of diffraction efficiency, an optical material having a refractive index $n1(\lambda)$ and an optical material having a refractive index $n2(\lambda)$ may be combined which have wavelength dependences such that d is approximately constant in the wavelength band of the light used. Generally speaking, a material having a high refractive index and a low wavelength dispersion and a material having a low refractive index and a high wavelength dispersion are to be combined. Patent Document 1 discloses using a glass or a resin as a first optical material to become the body and using a UV-curing resin as a second optical material.

When glass is used as the first optical material to become the body, micromachining becomes more difficult than in the case of a resin, and it is not easy to obtain a narrow diffraction grating pitch for improving the diffraction performance. Thus, it is difficult to enhance the optical performance while downsizing the optical element. Moreover, since the molding temperature of glass is higher than that of resin, a mold for molding glass has a lower durability than that of a mold for molding resin, thus resulting in a producibility problem.

On the other hand, when a resin is used as the first optical material to become the body, the diffraction grating has a better processability and moldability than those of glass. However, it is more difficult to realize various refractive index values than in the case of glass, so that the reduced refractive index difference between the first optical material and the second optical material is reduced, and thus the diffraction grating will have a large depth d, as is clear from eq. (1).

As a result of this, although the body itself has an excellent processability, the mold must be processed deep for forming the diffraction grating and the edges of the grooves must be shaped sharp, which makes the mold processing difficult. Moreover, due to processing constraints of at least one of the body and the mold, the pitch of the diffraction grating need to be made larger as the diffraction grating becomes deeper. Therefore, the diffraction grating cannot be increased in number, and the design constraints of the diffractive optical element are increased.

In order to solve such problems, the Applicants of the present application have proposed in Patent Document 2 to use a composite material as an optical adjustment layer, such that inorganic particles with an average particle size of 1 nm to 100 nm are contained in a matrix resin. With this composite material, it is possible to control the refractive index and Abbe number depending on the material of the inorganic particles to be dispersed and the added amount of the inorganic particles, thus providing refractive indices and Abbe numbers beyond what can be obtained with conventional resins. Therefore, by employing a composite material for the optical adjustment layer, an increased design freedom for the diffraction grating is obtained when using a resin as the first optical material to become the body, and an improved moldability is obtained, while providing wavelength characteristics with an excellent diffraction efficiency.

CITATION LIST

Patent Literature

[Patent Document 1] Japanese Laid-Open Patent Publication No. 10-268116
[Patent Document 2] A pamphlet of International Publication No. 07/026,597

SUMMARY OF INVENTION

Technical Problem

However, the inventors have found a problem in that, in the phase-difference type diffractive optical element disclosed in Patent Documents 1 and 2, when the body and the optical adjustment layer are composed of resin materials, in an environmental reliability test such as a thermal shock test or a high temperature and high humidity test which mocks a severe environment of use, a sufficient closeness of contact cannot be ensured at the interface between the body and the optical adjustment layer.

The present invention has been made in view of such problems of the conventional technique, and an objective thereof is to provide a diffractive optical element which is capable of maintaining a good tight contact state between the body and the optical adjustment layer even in the case where resins are used for a body and an optical adjustment layer, and which has a high reliability and excellent optical characteristics.

Solution to Problem

A diffractive optical element according to the present invention comprises: a body being composed of a first optical material containing a first resin, and having a diffraction grating on a surface thereof; and an optical adjustment layer being composed of a second optical material containing a second resin, and provided on the body so as to cover the diffraction grating, wherein, a difference between a solubility parameter of the first resin and a solubility parameter of the second resin is 0.8 $[cal/cm^3]^{1/2}$ or more; and the first resin and the second resin each have a benzene ring.

In a preferred embodiment, the second resin is a thermosetting resin or an energy-curing resin.

In a preferred embodiment, a refractive index of the first optical material is smaller than a refractive index of the second optical material, and a wavelength dispersion of the refractive index of the first optical material is greater than a wavelength dispersion of the refractive index of the second optical material.

In a preferred embodiment, the second resin has an OH group.

In a preferred embodiment, the second optical material further contains inorganic particles, the inorganic particles being dispersed in the second resin.

In a preferred embodiment, as a main component, the inorganic particles contain at least one selected from the group consisting of zirconium oxide, yttrium oxide, lanthanum oxide, hafnium oxide, scandium oxide, alumina, and silica.

In a preferred embodiment, the inorganic particles have an effective particle size of no less than 1 nm and no more than 100 nm.

In a preferred embodiment, the first resin is bisphenol A-type polycarbonate, and the second resin includes a bisphenol A structure as a portion of a unit molecular structure thereof.

In a preferred embodiment, the first resin is a polycarbonate having a phenol structure, and the second resin includes a phenol structure as a portion of a unit molecular structure thereof.

Advantageous Effects of Invention

According to the present invention, since the first resin and the second resin each have a benzene ring, a mutually attracting force acts between the benzene rings due to the influence of π electrons of the benzene rings of the first resin and the second resin, so that the optical adjustment layer is unlikely to peel from the surface of the body. Moreover, since the difference between the solubility parameter of the first resin and the solubility parameter of the second resin is 0.8 $[cal/cm^3]^{1/2}$ or more, the second resin of the optical adjustment layer is suppressed from dissolving into the body to deform the shape of the diffraction grating or generate an altered-refractive index layer.

Therefore, it is possible to maintain a good tight contact state between the optical adjustment layer and the body, whereby a diffractive optical element is obtained which is highly reliable and light-weight and which has excellent optical characteristics.

DESCRIPTION OF EMBODIMENTS

In a diffractive optical element having a body and an optical adjustment layer, based on the premise of using resins as main components of the materials composing the body and the optical adjustment layer, the inventors have conducted a detailed study concerning closeness of contact between the body and the optical adjustment layer.

Generally speaking, in order to attain close contact between resins, a chemical interaction may be caused between the two resin materials to achieve close contact. Specifically, it is considered that closeness of contact at the interface will be enhanced if the resins dissolve to each other at the interface between the two resins. However, in a diffractive optical element having a body and an optical adjustment layer, if an interaction occurs between the body containing a resin and the optical adjustment layer containing a resin, the body may swell or dissolve at the portion where the body adjoins the optical adjustment layer, thus resulting in a problem in that the shape of a diffraction grating which is provided on the body will not be as designed.

Figure 7:
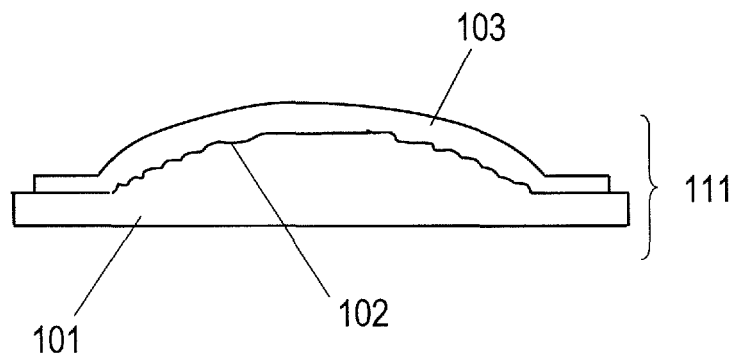
FIG. 7 A schematic diagram showing a conventional diffractive optical element having a deformed diffraction grating.

A conventional diffractive optical element 111 shown in FIG. 7 includes: a body 101 having a diffraction grating 102 provided on its surface; and an optical adjustment layer 103 provided so as to cover the diffraction grating 102. If the optical adjustment layer 103 and the body 101 are made of resin-containing optical materials, such that there is a strong chemical interaction between the two optical materials, the body 101 may swell or dissolve at the portion where the body 101 adjoins the optical adjustment layer 103, whereby the shape of the diffraction grating 102 may be deformed as shown in FIG. 7. When the shape of the diffraction grating 102 is deformed, diffracted light of a desired order may not be obtained with a sufficient intensity, or unwanted diffracted light may occur. As a result, the optical characteristics of the diffractive optical element are deteriorated.

Figure 8:
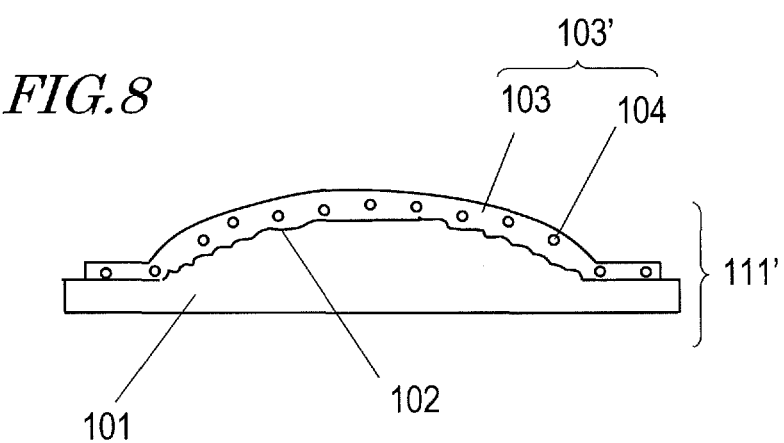
FIG. 8 A schematic diagram showing another conventional diffractive optical element having a deformed diffraction grating.

FIG. 8 shows a conventional diffractive optical element 111' having: an optical adjustment layer 103' composed of a nanocomposite in which inorganic microparticles 104 are dispersed in a resin-containing optical adjustment layer 103; and a body 101. In the diffractive optical element 111', too, if the chemical interaction between the resin of the matrix 103 of the optical adjustment layer 103' and the resin of the body 101 is strong, the shape of the diffraction grating 102 may be deformed as shown in FIG. 8 due to the body 101 swelling or dissolving. As a result, the optical characteristics of the diffractive optical element are deteriorated.

Figure 9:
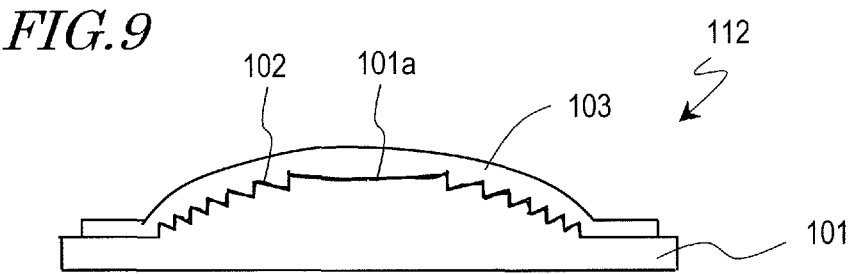
FIG. 9 A diagram schematically showing, in a conventional diffractive optical element, an altered-refractive index layer having been formed at the interface between a body and an optical adjustment layer.

Through a study by the inventors, it has been found that unwanted diffracted light may occur in the diffractive optical element 111 even if there is no change in the shape of the diffraction grating 102. As shown in FIG. 9, in the conventional diffractive optical element 112, if the resin contained in the optical adjustment layer 103 permeates into the interior through the surface of the body 101, the refractive index of the body 101 is changed at the portion where the resin has permeated, even when the shape of the diffraction grating 102 provided on the surface of the body 101 is not greatly changed. It was confirmed that, as shown in FIG. 9, a layer 101a having a different refractive index (hereinafter referred to as the "altered-refractive index layer") from the body 101 was formed at the interface between the body 101 and the optical adjustment layer 103 in this case. It was possible to confirm the altered-refractive index layer 101a with an optical microscope, and the altered-refractive index layer 101a had a thickness of about 500 nm to 5000 nm. Furthermore, the surface of the body 101 of the diffractive optical element whose diffraction efficiency had deteriorated was analyzed, whereby it was confirmed that, even in the case where an altered-refractive index layer 101a was not recognizable with an optical microscope, an altered-refractive index layer had occurred which had enough thickness to cause deterioration in the diffraction efficiency, or which had undergone a change in refractive index.

Figure 10:
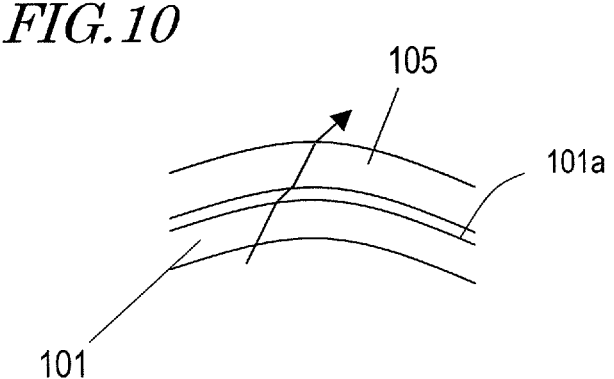
FIG. 10 A diagram schematically showing refraction of light in an optical element in which a layer with an altered refractive index is formed at the interface between a body and an optical adjustment layer.

In an optical system which only utilizes the refraction phenomenon, as shown in FIG. 10, even if the altered-refractive index layer 101a is generated between the body 101 and the layer 105 for optical characteristics adjustment, the angle at which light (shown by the arrow) entering from the body 101 is refracted at the interface between the body 101 and the altered-refractive index layer 101a will be small so long as the difference in refractive index between the altered-refractive index layer 101a and the body 101 is about 0.01. Moreover, if the altered-refractive index layer 101a is thin, the distance traveled by the light at the refracted angle will also be short. Therefore, even if the altered-refractive index layer 101a is generated, the incident angle and incident position of the light entering the layer 105 are hardly changed from those in the case where the altered-refractive index layer 101a is not generated, and the influence on the optical performance is negligibly small. In other words, even if the altered-refractive index layer 101a is generated, its influence is negligible. Thus, it can be said that the influence of generation of an altered-refractive index layer is a problem which is unique to a diffractive optical element in which an optical adjustment layer is arranged so as to cover a body on which a diffraction grating is provided.

Based on such findings, the inventors have arrived at a novel diffractive optical element. In a diffractive optical element according to the present invention, a resin contained in a body and a resin contained in an optical adjustment layer each have a benzene ring. As a result, the closeness of contact between the body and the optical adjustment layer can be enhanced by interactions between π electrons of the benzene rings. It has also been found that, if there is a large difference in solubility parameter between the resin contained in the body and the resin contained in the optical adjustment layer, the resin of the optical adjustment layer will be prevented from dissolving into the body, deforming the shape of the diffraction grating, and allowing an altered-refractive index layer to be generated, whereby a diffractive optical element having a high reliability and excellent optical characteristics can be realized. Hereinafter, specific embodiments of the present invention will be described.

First Embodiment

Figure 1:
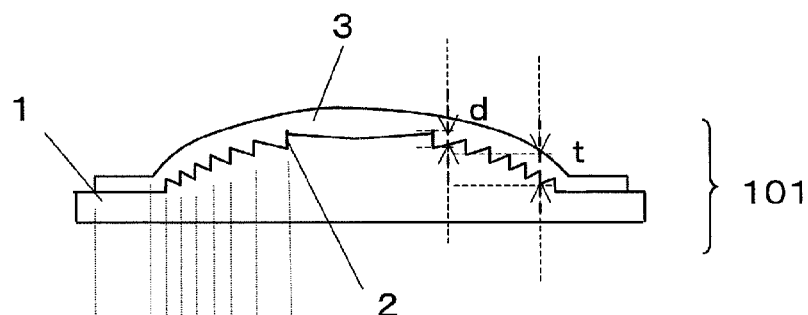
FIGS. 1 (a) and (b) are a cross-sectional view and an upper plan view showing a first embodiment of a diffractive optical element according to the present invention, and (c) is a cross-sectional view showing body shape.
Figure 1:
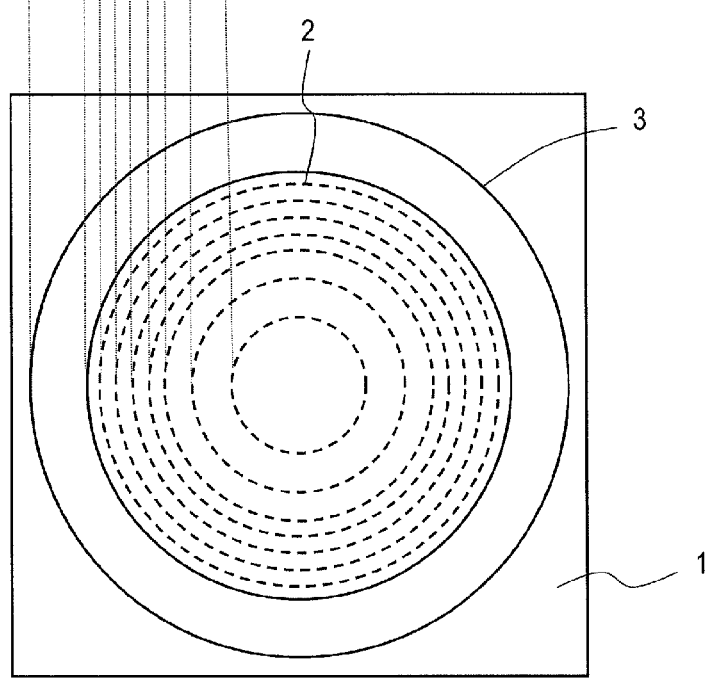
Figure 1:
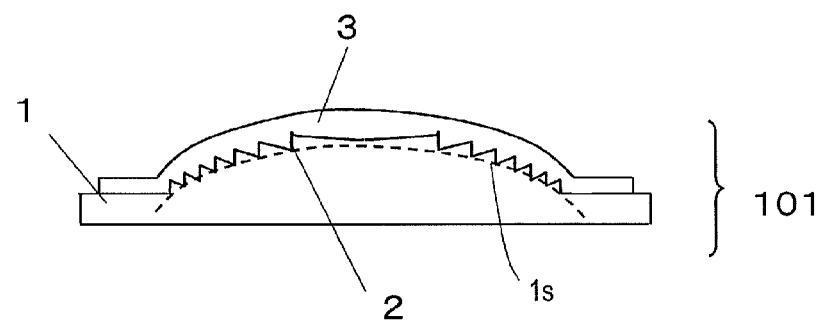

FIG. 1(*a*) and FIG. 1(*b*) show a cross-sectional view and an upper plan view of a first embodiment of the diffractive optical element according to the present invention.

The diffractive optical element 101 includes a body 1 and an optical adjustment layer 3. The body 1 is composed of a first optical material containing a first resin, whereas the optical adjustment layer 3 is composed of a second optical material containing a second resin.

A diffraction grating 2 is provided on one principal face of the body 1. The cross-sectional shape, positioning, pitch, and depth of the diffraction grating 2 are to be determined based on the optical characteristics of the body 1 and the optical adjustment layer 3 and the optical design of the diffractive optical element 101 to be finally obtained. For example, in order to confer a lens action to the diffraction grating 2, a diffraction grating having a sawtooth cross-sectional shape may be provided in the form of concentric circles with pitches gradually changing from the lens center toward the perimeter. The diffraction grating in this case may be formed on a curved surface as shown in FIG. 1(*a*), or on a plane, so long as it has a cross-sectional shape, positioning, and pitch for attaining a lens action. In particular, by forming the diffraction grating 2 on the body 1 so that an envelope 1s which extends through the grooves of the diffraction grating 2 presents an aspherical surface having a lens action as shown in FIG. 1(*c*), the chromatic aberration, curvature of field, and the like can be improved with a good balance on the basis of an optimum combination of refractive action and diffractive action, whereby a lens having a high imaging performance can be obtained. The depth d of the diffraction grating 2 can be determined by using eq. (1).

FIG. 1(*a*) shows a diffractive optical element having the diffraction grating 2 on one principal face; however, a construction having two or more diffraction grating surfaces may also be adopted. FIG. 1(*a*) shows a diffractive optical element one of whose faces is a convex surface having the diffraction grating 2 and whose opposite face is a plane; however, so long as a diffraction grating is formed on at least one face, the two principal faces of the body 1 may be both convex surfaces, a convex surface and a concave surface, both concave surfaces, a concave surface and a plane, or both planes. In this case, the diffraction grating(s) may be formed on only one face, or on both faces. In the case where the diffraction gratings are formed on both faces, the diffraction gratings on both faces do not need to be identical in shape, positioning, pitch, and diffraction grating depth, so long as they satisfy the performance that is required of the diffractive optical element. These aspects are also true of the second embodiment below.

For the purpose of reducing the wavelength dependence of diffraction efficiency of the diffractive optical element 101, the optical adjustment layer 3 is provided so as to cover the principal face of the body 1 on which the diffraction grating 2 is provided, in a manner of at least filling the stepped portions of the diffraction grating 2. In the present embodiment, as shown in FIGS. 1(*a*) and (*c*), the optical adjustment layer 3 is formed so as to have a substantially uniform thickness t along the envelope extending through the grooves of the diffraction grating 2. As a result, the surface of the optical adjustment layer 3 becomes an aspherical shape, such that a refraction effect corresponding to the aspherical shape can be conferred to the light going from the optical adjustment layer 3. Therefore, by blending the diffraction effect by the diffraction grating 2 and the refraction effect at the surface of the optical adjustment layer 3 so as to reduce the chromatic aberration and curvature of field, the lens characteristics can be improved.

In order to reduce the wavelength dependence of diffraction efficiency, it is preferable that the body 1 and the optical adjustment layer 3 satisfy eq. (1) in the entire wavelength region of light that is used. For this purpose, it is preferable that the first optical material of the body 1 and the second optical material of the optical adjustment layer 3 have characteristics such that they exhibit opposite tendencies in terms of wavelength dependence of the refractive index, so that changes in the refractive index with respect to wavelength are mutually canceled. More specifically, it is preferable that the refractive index of the first optical material is smaller than the refractive index of the second optical material, and that the wavelength dispersion of the refractive index of the first optical material is greater than the wavelength dispersion of the refractive index of the second optical material. The wavelength dispersion of the refractive index is expressed by an Abbe number, for example. The greater the Abbe number is, the smaller the wavelength dispersion of the refractive index is. Therefore, it is preferable that the refractive index of the first optical material is smaller than the refractive index of the second optical material, and that the Abbe number of the first optical material is smaller than the Abbe number of the second optical material. The wavelength dependences of the refractive index of the first optical material and the second optical material depend on the physical characteristics of the first resin and the second resin contained therein.

As described above, the first optical material composing the body 1 contains a first resin. The reason why a resin-containing material is used as the first optical material is that it is more preferable to use a resin than glass from the standpoint of producibility and processability. An optical element such as a lens can be produced by molding with a high producibility. In this case, the mold life depends on the material which is molded, and the mold life is about 10 times longer in the case of using a resin than in the case of using glass, and the production cost can be reduced. Moreover, it may be difficult to mold glass into a minute shape such as a diffraction grating shape; with a resin, on the other hand, an optical element having a minute shape can be molded because techniques such as injection molding are available. Since use of a resin provides excellent micromachining, by reducing the pitch of the diffraction grating 2, the performance of the diffractive optical element 101 can be improved, and the diffractive optical element 101 can be downsized. Furthermore, it is possible to reduce the weight of the diffractive optical element 101.

As the first resin, from among the translucent resin materials which are generally used as bodies of optical elements, a material having refractive index characteristics and wavelength dispersion for making it possible to reduce the wavelength dependence of diffraction efficiency of the diffractive optical element at a designed order. Other than the first resin, the first optical material may contain inorganic particles for adjusting optical characteristics, e.g., the refractive index, and dynamic properties, e.g., thermal expansion, and additives such as a dyestuff or pigment for absorbing electromagnetic waves in a specific wavelength region.

Similarly, the second optical material composing the optical adjustment layer 3 contains a second resin. The reason for using a resin-containing material as the second optical material is also for a good moldability of the optical adjustment layer 3 filling the stepped portions of the diffraction grating 2. Furthermore, a lower molding temperature than that of an inorganic material is obtained, which is particularly preferable in the case where the body 1 is composed of a first optical material containing the first resin.

Next, the first resin contained in the first optical material and the second resin contained in the second optical material will be described more specifically.

The first resin and the second resin each have a benzene ring. Moreover, the first resin and the second resin are selected from among known resin materials so that, as described above, the first optical material and the second optical material exhibit desired wavelength dependence of the refractive index.

Figure 2:
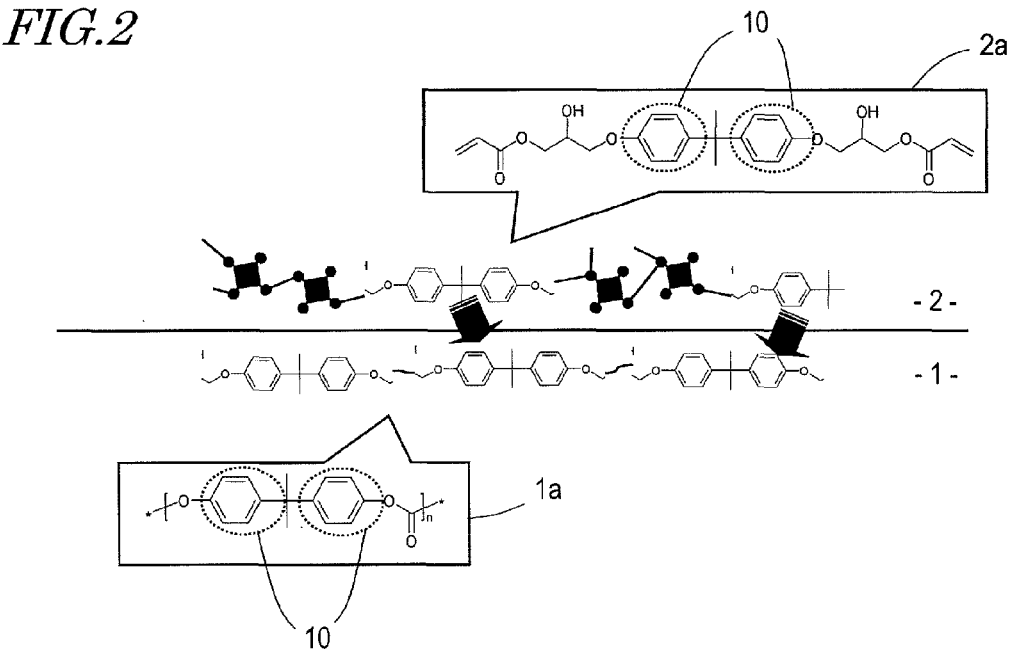
FIG. 2 A schematic diagram describing closeness of contact between the body and the optical adjustment layer.

FIG. 2 schematically shows the neighborhood of an interface between the body 1 and the optical adjustment layer 3 in the case where bisphenol A-type polycarbonate 1*a* is used as an example of the first resin contained in the first optical material composing the body 1 and where epoxy acrylate resin 2*a*, having the same bisphenol A structure, is used as the second resin contained in the second optical material composing the optical adjustment layer 3.

The bisphenol A-type polycarbonate 1*a* and the epoxy acrylate resin 2*a* have benzene rings in portions encircled by broken lines 10. At the interface between the body 1 and the optical adjustment layer 3, when the benzene rings of the bisphenol A-type polycarbonate 1*a* are at positions near the benzene rings of the epoxy acrylate resin 2*a*, it is considered that a mutually attracting force ($\pi$ electron interaction) acts due to the influence of $\pi$ electrons of the benzene rings. This makes it unlikely for the optical adjustment layer 3 to peel from the surface of the body 1. On the other hand, in the case where either one of the first resin and the second resin does not have benzene rings, the $\pi$ electron interaction does not act, so that the adhesion force between the body 1 and the optical adjustment layer 3 may not be sufficient in a severe environment of use, e.g., in case of rapid temperature changes or vibration. The inventors have found that, when a diffractive optical element for which such a material system is used is subjected to an environmental reliability test such as a thermal shock test or a high temperature and high humidity test, the optical adjustment layer will peel from the body.

Examples of the first resin having benzene rings include polycarbonate-type resins, (metha)acrylic resins, olefin resins such as polystyrene, epoxy resins, and the like which have benzene rings in their unit molecular structures. A benzene ring may be included in at least one of the main chain and side chain within the unit molecular structure. As used herein, a unit molecular structure means a repetition unit of a polymer. The reason is that these resins excel in translucency, and are suitable as optical materials. So long as benzene rings are included in the main chain or the side chain, the resin may be synthesized through copolymerization or graft polymerization. Moreover, the first resin may be composed of an alloy or a blend of a resin lacking benzene rings and an aforementioned resin having benzene rings.

Examples of the second resin having benzene rings include: (metha)acrylic resins such as acrylate, methacrylate, urethane acrylate, epoxy acrylate, and polyester acrylate; epoxy resins; oxetane resins; thiol-ene resins; polyester resins such as polyethylene terephthalate and polybutylene terephthalate; olefin resins such as polystyrene; polyamide resins such as nylon; polyimide resins such as polyimide and polyetherimide; and the like which have benzene rings in their unit molecular structures. A benzene ring may be included in at least one of the main chain and side chain within the unit molecular structure. Moreover, the second resin may be composed of an alloy or a blend of a resin lacking benzene rings and an aforementioned resin having benzene rings. In particular, it is preferable that the aforementioned resins having benzene rings are contained in the second resin so as to account for 20 weight % or more. Moreover, modified versions of such resins may be used.

Among these, it is particularly preferable to use a thermosetting resin or an energy beam-curing resin because it will simplify the process of forming the optical adjustment layer 3. Specific examples are acrylate resins, methacrylate resins, epoxy resins, oxetane resins, thiol-ene resins, and the like which have benzene rings in their main chain or side chain.

By constructing the body 1 and the optical adjustment layer 3 using the first optical material and second optical material, which respectively contain the aforementioned first resin and second resin, the optical adjustment layer 3 is prevented from peeling from the body 1 in a severe environment. However, depending on the combination of the aforementioned first resin and second resin, the second resin of the optical adjustment layer 3 may dissolve into the body 1 due to chemical interactions between the resins, thus deforming the shape of the diffraction grating 2 as shown in FIG. 7 and FIG. 8, allowing the altered-refractive index layer 9 to occur as shown in FIG. 9, or allowing unwanted diffracted light to occur in an optical characteristics evaluation even though no altered-refractive index layer may be observed, thus resulting in a possibility of not being able to obtain a desired diffraction efficiency.

In order to prevent deteriorations in diffraction efficiency due to such causes, it is necessary to reduce the interaction between the second optical material of the optical adjustment layer 3 and the first optical material of the body 1. Therefore, it is preferable that a difference in solubility parameter (SP) between the second resin contained in the second optical material and the first resin of the first optical material is 0.8 $[cal/cm^3]^{1/2}$ or more.

The solubility parameter is a square root of the cohesive energy density of a substance under the regular solution theory. The solubility parameter $\delta$ of a substance is defined by the following equation, using a molar volume V and a cohesive energy $\Delta E$ per mol.

$$\delta = (\Delta E/V)^{1/2}$$

The solubility parameter is an index of the intermolecular force of a substance, and it is considered that substances having closer solubility parameters have a higher affinity, i.e., stronger interaction. There are various methods to derive a solubility parameter. For example, a value which is obtained by a method, of Fedors et al., of calculating from a molecular structural formula can be used. The solubility parameter to be used in the present specification is a value which is determined by this method of calculating from the molecular structural formula. Examples of structures that enhance the solubility parameter include highly polar functional groups, such as the OH group and the amide bond. Among others, a resin having an OH group is easy to synthesize, and is highly stable because it is less susceptible to hydrolysis or the like than a resin having a polar bond such as an amide bond. Therefore, from these standpoints, it is more preferable that the second resin contains an OH group. On the other hand, examples of structures for lowering the solubility parameter include the fluorine atom, the hydrocarbon group, the siloxane bond, and the like.

Figure 3:
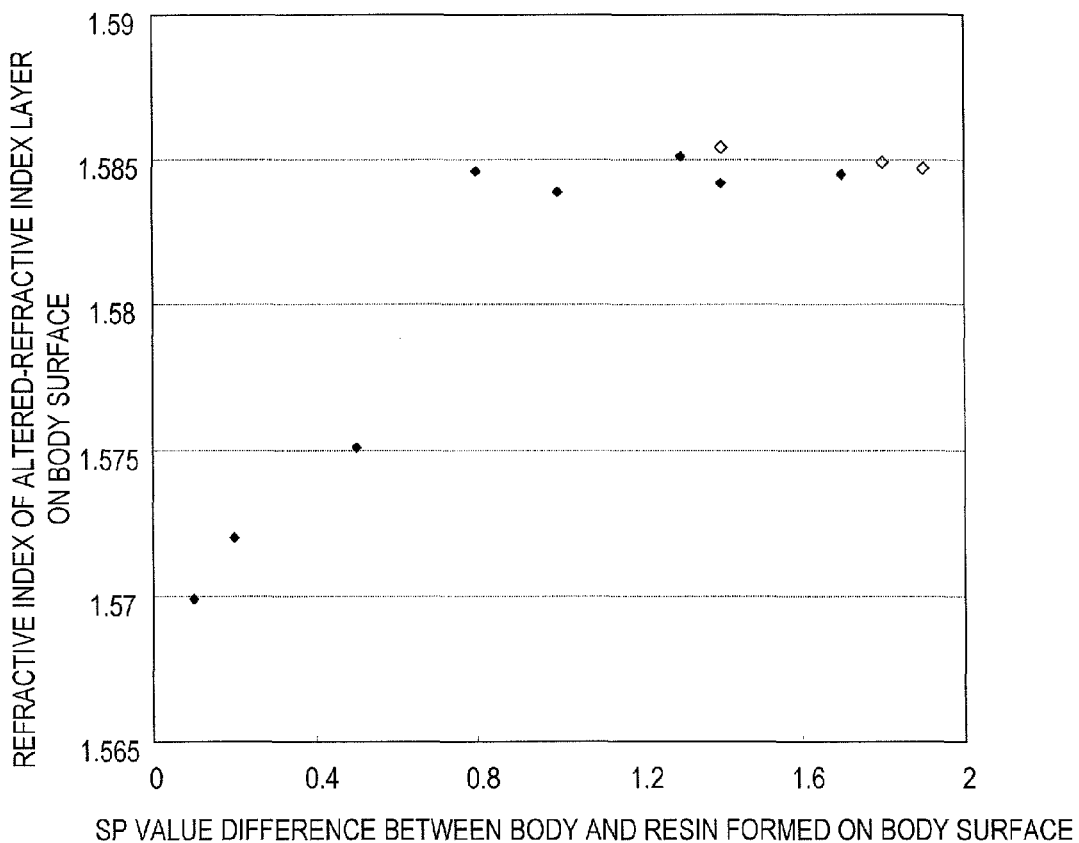
FIG. 3 A graph showing, a relationship between a difference in SP value between polycarbonate and acrylate resin and the refractive index of an altered-refractive index layer formed on the body surface, in the case where acrylate resin is formed on a body composed of bisphenol A-type polycarbonate.

FIG. 3 shows, in the case where acrylate resins having various solubility parameter values are formed on a body composed of bisphenol A-type polycarbonate, results of measuring the refractive index of an altered-refractive index layer which is formed in a region near the surface of the body adjoining the acrylate resin. The horizontal axis represents a difference in SP value between the body and the acrylate resin formed on the body surface, whereas the vertical axis represents the refractive index of the altered-refractive index layer formed on the body surface. A prism coupler (MODEL2010 manufactured by Metricon Corporation) was used for the refractive index measurement. It can be seen from FIG. 3 that the refractive index is an approximately constant value when the difference in SP value between the body and the acrylate resin is 0.8 $[cal/cm^3]^{1/2}$ or more. This is presumably because, when the difference between the solubility parameter values is 0.8 $[cal/cm^3]^{1/2}$ or more, the acrylate resin has not permeated the body to an extent that any change in the refractive index would occur, and thus there is substantially no interaction. Thus, even when an aforementioned resin is used as the first resin of the first optical material composing the body 1, if its difference in solubility parameter value from the second resin is 0.8 $[cal/cm^3]^{1/2}$ or more, substantially no interaction occurs and deteriorations in diffraction efficiency can be suppressed.

In the case where a thermosetting resin or an energy beam-curing resin is used as the second resin composing the optical adjustment layer 3, a heat or energy beam is supplied to the monomer or oligomer serving as the raw material to allow a polymerization reaction to progress, whereby the second resin is obtained. Therefore, in the process of forming the optical adjustment layer 3, the monomer or oligomer serving as the raw material of the second resin comes in contact with the body 1. Therefore, in this case, it is preferable that the difference in solubility parameter (SP) between the second resin contained in the second optical material, the raw material of the second resin in an uncured or unpolymerized state and the first resin of the first optical material is 0.8 $[cal/cm^3]^{1/2}$ or more.

Due to their molecular structure including a reactive functional group having polarity, it is difficult for a thermosetting resin or an energy beam-curing resin to have a solubility parameter whose value is lower than that of the body 1 by 0.8 $[cal/cm^3]^{1/2}$ or more. Therefore, in the case where a thermosetting resin or an energy beam-curing resin is used as a component of the optical adjustment layer 3, it is particularly preferable to use that which having a solubility parameter which is higher than the solubility parameter of the body 1 by 0.8 $[cal/cm^3]^{1/2}$ or more.

In accordance with the diffractive optical element of the present embodiment, the first resin contained in the first optical material composing the body and the second resin contained in the second optical material composing the optical adjustment layer each have a benzene ring. Therefore, due to the influence of π electrons of the benzene rings of the first resin and the second resin, a mutually attracting force acts between the benzene rings, thus making it unlikely for the optical adjustment layer 3 to peel from the surface of the body 1. Moreover, since the difference between the solubility parameter of the first resin and the solubility parameter of the second resin is 0.8 $[cal/cm^3]^{1/2}$ or more, the second resin of the optical adjustment layer 3 is suppressed from dissolving into the body 1 to deform the shape of the diffraction grating 2 or generate an altered-refractive index layer.

Therefore, there is obtained a diffractive optical element which is highly reliable and light-weight and which has excellent optical characteristics such that, even in a severe environment of use, the optical adjustment layer will not peel from the body and can maintain a good tight contact state. Moreover, since a resin is used for the body, there is a relatively easy moldability, and the mold life can be prolonged. Thus, the diffraction grating element according to the present embodiment has an excellent mass producibility. Since the diffractive optical element of the present embodiment has such characteristic features, it is suitably used as an optical element of e.g. an optical apparatus which is disposed in a place of great changes in ambient temperature or vibrations, more specifically, a monitoring camera which is disposed outdoors or an onboard camera for an automobile.

In the diffractive optical element 101 of the present embodiment, an antireflection layer may be provided on the surface of the optical adjustment layer 3. There is no particular limitation to the material of the antireflection layer so long as it is a material having a smaller refractive index than that of the optical adjustment layer 3. For example, a resin or a composite material of resin and inorganic particles, or a thin inorganic film which is formed by vacuum evaporation or the like can be used. Examples of inorganic particles to be used in a composite material as the antireflection layer include silica, alumina, magnesium oxide, and the like having a low refractive index. Moreover, nanostructure antireflection shapes may be formed on the surface of the optical adjustment layer 3. Nanostructure antireflection shapes can be easily formed by a transfer technique using a mold (nanoimprint), for example. Moreover, on the surface of the optical adjustment layer 3 or the antireflection layer, a surface layer having an action of adjusting dynamic properties such as abrasion resistance or thermal expansion may be separately formed. Furthermore, on the surface of the optical adjustment layer 3 or the antireflection layer, a surface layer having an action of adjusting dynamic properties such as abrasion resistance or thermal expansion may be separately formed.

Second Embodiment

Figure 4:
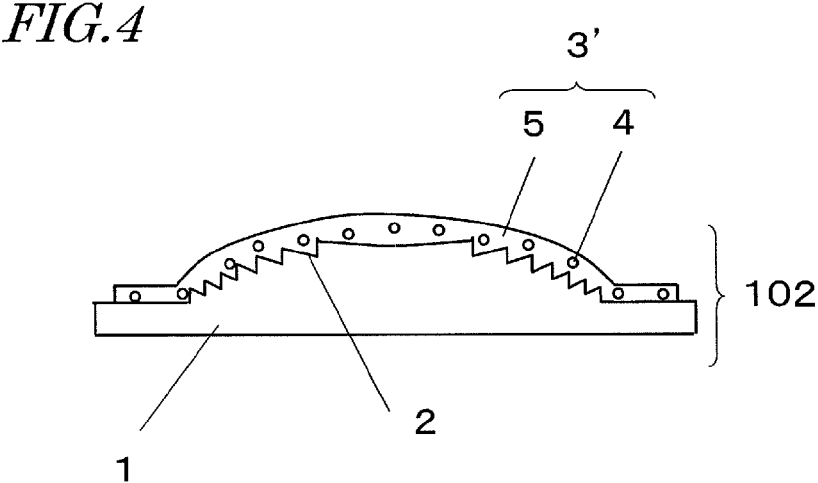
FIG. 4 A cross-sectional view showing a second embodiment of a diffractive optical element according to the present invention.

A second embodiment of the diffractive optical element according to the present invention will be described. FIG. 4 schematically shows a cross section of a diffractive optical element 102. The diffractive optical element 102 differs from the first embodiment in that a composite material obtained by dispersing inorganic particles 4 in a matrix 5 containing a second resin is used as a second optical material composing the optical adjustment layer 3'.

Since a composite material obtained by dispersing the inorganic particles 4 in the matrix 5 containing the second resin is used, it becomes possible to adjust the refractive index and the Abbe number of the second optical material. Therefore, by using the second optical material having the adjusted appropriate refractive index and Abbe number as the optical adjustment layer 3', the diffraction efficiency in the wavelength band of the diffractive optical element 102 can be improved.

Moreover, by dispersing the inorganic particles 4 having a high refractive index in the matrix 5, it becomes possible for the second optical material to have a high refractive index that cannot be attained with only a resin. Therefore, the refractive index difference between the first optical material and the second optical material can be broadened, which makes it possible to reduce the depth of the diffraction grating 2, as is clear from eq. (1). As a result, in the case where the body 1 is produced by molding, the diffraction grating 2 will have an improved transferability. Moreover, since the stepped portions of the diffraction grating 2 can be made shallow, transfer is still easy even when the intervals between the stepped portions are narrowed. This allows for an improvement in diffraction performance based on a narrower pitch of the diffraction grating 2. Furthermore, it becomes possible to use a material having various physical characteristics for the second resin, and reconciliation with characteristics other than optics is more facilitated.

The second resin contained in the matrix 5 has benzene rings, as in the first embodiment. Moreover, it is preferable that the difference in solubility parameter value between the first resin contained in the first optical material composing the body 1 and the second resin is 0.8 $[cal/cm^3]^{1/2}$ or more. In the case where a solvent or the like is added in order to allow the inorganic particles to be dispersed, it is preferable that the difference in solubility parameter value between the solvent or the like to be added and the first resin contained in the first optical material composing the body 1 is also 0.8 $[cal/cm^3]^{1/2}$ or more. As a result, the optical adjustment layer 3' will not peel from the body 1 and can maintain a good tight contact state, and the second resin of the optical adjustment layer 3' is suppressed from dissolving into the body 1 to deform the shape of the diffraction grating 2 or generate an altered-refractive index layer.

Generally speaking, the inorganic particles 4 are likely to have a higher refractive index than those of resins. Therefore, in the case where a first optical material containing the first resin is used for the body 1 and a second optical material obtained by dispersing the inorganic particles 4 in a matrix containing a second resin is used as the optical adjustment layer 3', it is preferable that the second optical material is adjusted so as to exhibit a higher refractive index and a lower wavelength dispersion than those of the first optical material, because then there will be more materials to choose from as the inorganic particles 4. In other words, it is preferable that the first optical material has a lower refractive index and a higher wavelength dispersion than those of the second optical material.

The refractive index of the second optical material as the composite material can be inferred based on the Maxwell-Garnett theory expressed by eq. (2) below, from the refractive indices of the second resin contained in the matrix and the inorganic particles 4, for example.

In eq. (2), $n_{COM}\lambda$ is an average refractive index of the second optical material at a given specific wavelength λ, whereas $n_p\lambda$ and $n_m\lambda$ are the refractive indices of the inorganic particles and second resin at this wavelength λ. P is a volumetric ratio of the inorganic particles relative to the entire second optical material. In eq. (2), by inferring the refractive indices at Fraunhofer's D line (589.2 nm), F line (486.1 nm), and C line (656.3 nm) as the wavelengths λ, it is possible to further infer the Abbe number of the composite material.

Conversely, the mixing ratio between the second resin and the inorganic particles 4 may be determined through an inference based on this theory.

[Eq. 2]

$$n_{COM\lambda}^2 = \frac{n_{p\lambda}^2 + 2n_{m\lambda}^2 + 2P(n_{p\lambda}^2 + 2n_{m\lambda}^2)}{n_{p\lambda}^2 + 2n_{m\lambda}^2 - P(n_{p\lambda}^2 + 2n_{m\lambda}^2)} n_{m\lambda}^2 \quad (2)$$

Note that, in the case where the inorganic particles 4 absorb light or the inorganic particles 4 include a metal in eq. (2), the refractive index of eq. (2) is to be calculated as a complex refractive index. Eq. (2) is an equation which holds true when $n_p\lambda \geq n_m\lambda$. When $n_p\lambda < n_m\lambda$, the refractive index is to be inferred by using eq. (3) below.

[Eq. 3]

$$n_{COM\lambda}^2 = \frac{n_{m\lambda}^2 + 2n_{p\lambda}^2 + 2(1-P)(n_{m\lambda}^2 + 2n_{p\lambda}^2)}{n_{m\lambda}^2 + 2n_{p\lambda}^2 - (1-P)(n_{m\lambda}^2 + 2n_{p\lambda}^2)} n_{p\lambda}^2 \quad (3)$$

As described above, in the case where a second optical material made of a composite material is used for the optical adjustment layer 3', it is necessary that the second optical material has a higher refractive index than that of the first optical material and a lower wavelength dispersion than that of the first optical material. Therefore, it is preferable that the main component of the inorganic particles 4 to be dispersed in the second resin is also a material having a low wavelength dispersion, i.e., a high Abbe number. Particularly, in the case where a polycarbonate-type resin having benzene rings is used as the first resin, it is preferable that a material having an Abbe number of 25 or more is the main component of the inorganic particles 4. It is particularly preferable that the main component is at least one oxide selected from the group consisting of zirconium oxide (Abbe number: 35), yttrium oxide (Abbe number: 34), lanthanum oxide (Abbe number: 35), hafnium oxide (Abbe number: 32), scandium oxide (Abbe number: 27), alumina (Abbe number: 76), and silica (Abbe number: 68), for example. Alternatively, a complex oxide thereof may be used. So long as eq. (1) is satisfied in the light wavelength band in which the diffractive optical element 102 is used, inorganic particles exhibiting a high refractive index, such as titanium oxide and zinc oxide, may be allowed to coexist with these inorganic particles.

It is preferable that the effective particle size of the inorganic particles 4 is no less than 1 nm and no more than 100 nm. When the effective particle size is 100 nm or less, losses due to Rayleigh scattering can be reduced, and the transparency of the optical adjustment layer 3' can be enhanced. When the effective particle size is 1 nm or more, influences of light emission due to a quantum effect and the like can be suppressed. As necessary, the second optical material may contain additives such as a dispersant for improving the dispersiveness of the inorganic particles, a polymerization initiator, and a leveling agent.

Figure 5:
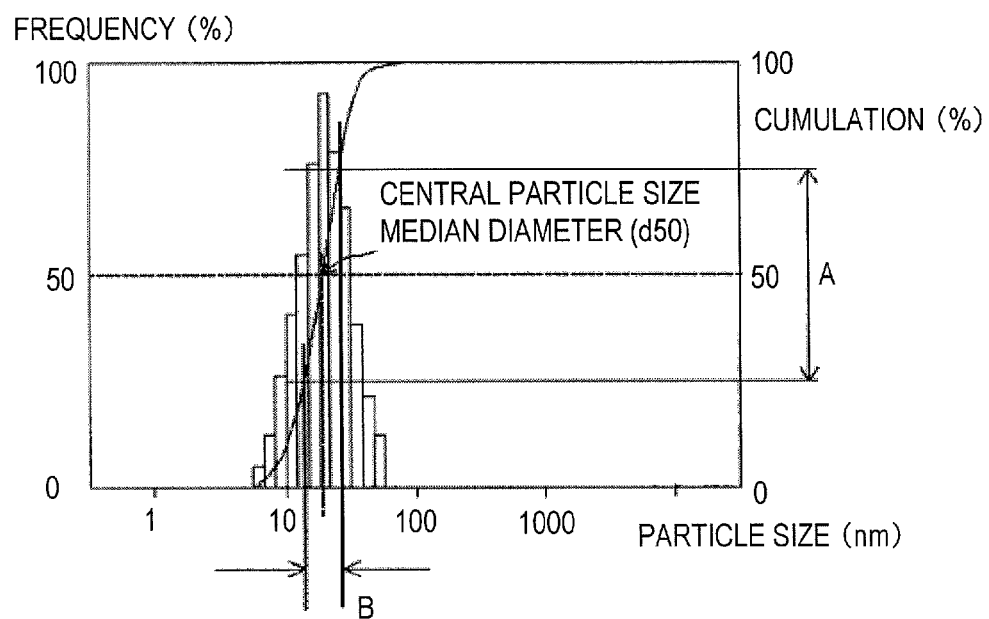
FIG. 5 A graph for describing a definition of an effective particle size of particles.

Now, the effective particle size will be described with reference to FIG. 5. In FIG. 5, the horizontal axis represents particle size of inorganic particles, whereas the left vertical axis represents frequency of inorganic particles with respect to the particle size on the horizontal axis. The right vertical axis represents cumulative frequency of particle sizes. An effective particle size refers to, in a particle size frequency distribution of the entirety of inorganic particles, a range B of particle sizes whose cumulative frequency falls within a range A of 50% around a central particle size, the central particle size being defined as a particle size whose cumulative frequency is 50% (median diameter: d50). Therefore, it is preferable that the range of the effective particle size of the inorganic particles 4 thus defined is in the range of no less than 1 nm and no more than 100 nm. In order to accurately determine an effective particle size value, it is preferable to measure 200 or more inorganic particles, for example.

In the case where a second optical material made of a composite material is used for the optical adjustment layer 3', the stepped portions of the diffraction grating 2 can be made shallow, and the optical adjustment layer 3' to be formed so as to cover the diffraction grating 2 can also be made thin. As a result, Rayleigh scattering within the optical adjustment layer 3' caused by the inorganic particles 4 is reduced, whereby a diffractive optical element 22 with even smaller optical losses can be realized. In the case where a composite material is used as the second optical material composing the optical adjustment layer 3', the depth d (stepped portion) of the diffraction grating 2 shown in FIG. 1 is preferably 20 μm or less, and the thickness t of the optical adjustment layer 3' is preferably no less than the depth d of the diffraction grating 2 and no more than 200 μm at the thickest portion, and particularly preferably no less than the depth d and no more than 100 μm.

In the case where a second optical material made of a composite material having a high refractive index and a low wavelength dispersion is used for the optical adjustment layer 3', the first resin of the first optical material composing the body 1 needs to have a low refractive index and a high wavelength dispersion. A polycarbonate-type resin having benzene rings has a relatively low Abbe number, and is suitable for adjusting the wavelength dispersion of the refractive index. However, as necessary, so as to satisfy eq. (1) between itself and the second optical material, a polycarbonate-type resin may be allowed to copolymerize with another resin, alloyed with another resin, or another resin may be blended thereto, thus being used as the first optical material. The first optical material may contain additives.

The second resin contained in the second optical material may also be composed of an alloy or blend of a resin lacking benzene rings and a resin having benzene rings. In particular, it is preferable that an aforementioned resin having benzene rings is contained in the second resin so as to account for 20 weight % or more.

Thus, in accordance with the diffractive optical element of the present embodiment, even in the case where a composite material in which inorganic particles are dispersed is used as the second optical material, the first resin contained in the first optical material composing the body and the second resin contained in the second optical material each have a benzene ring. As a result, as has been described in the first embodiment, a mutually attracting force acts between the benzene rings, so that the optical adjustment layer is unlikely to peel from the surface of the body. Moreover, since the difference between the solubility parameter of the first resin and the solubility parameter of the second resin is 0.8 $[cal/cm^3]^{1/2}$ or more, the second resin of the optical adjustment layer is suppressed from dissolving into the body to deform the shape of the diffraction grating or generate an altered-refractive index layer.

Therefore, there is obtained a diffractive optical element which is highly reliable and light-weight and which has excellent optical characteristics such that, even in a severe environment of use, the optical adjustment layer will not peel from the body and can maintain a good tight contact state.

Moreover, since a resin is used for the body, there is a relatively easy moldability, and the mold life can be prolonged. Thus, the diffraction grating element according to the present embodiment has an excellent mass producibility.

In particular, by using a composite material as the optical adjustment layer, the diffraction grating depth is reduced, thus facilitating the processing. The shallower the diffraction grating depth is, the closer any adjoining diffraction stepped portions can be brought together; that is, the pitch can be narrowed, whereby a high diffraction effect can be provided. As a result, a diffractive optical element with a high performance can be realized.

Note that, as in the first embodiment, an antireflection layer may be provided on the surface of the optical adjustment layer 3' also in the diffractive optical element 102 of the present embodiment.

EXAMPLES

Hereinafter, results of producing diffractive optical elements according to the present invention and evaluating their characteristics will be specifically described.

Example 1

A diffractive optical element 101 having the structure shown in FIGS. 1(a) to (c) was produced by the following method. The diffractive optical element 101 has a lens action, and is designed so as to utilize $1^{st}$ order diffracted light. This is also true of the following Examples.

First, as the first resin, bisphenol A-type polycarbonate resin (d-line refractive index: 1.585; Abbe number: 28; SP value: 9.8 $[cal/cm^3]^{1/2}$) was injection-molded, thus producing a body 1 having an annular diffraction grating 2 with a depth d of 39 μm on one face, in which the foot of the diffraction grating had an aspherical envelope 1s. The effective radius of the lens portion was 0.828 mm; the number of rings was 29; the smallest ring pitch was 14 μm; and the diffraction surface had a paraxial R (radius of curvature) of −1.0144 mm. The structure of the bisphenol A-type polycarbonate resin used is shown in FIG. 2(1a). The bisphenol A-type polycarbonate resin 1a may be regarded as a polycarbonate with a phenol structure.

Next, as a raw material of the second resin of the optical adjustment layer 3, epoxy acrylate having a bisaryl fluorene backbone (SP value: 11.2 $[cal/cm^3]^{1/2}$) was applied onto the entire face of the annular diffraction grating 2 of the body 1 by using a pad printer (SPACE PAD system manufactured by MISHIMA CO., LTD.). Thereafter, the epoxy acrylate having a bisaryl fluorene backbone was cured by being irradiated with ultraviolet (illuminance: 120 mW/cm²; cumulative light amount: 4000 mJ/cm²), thereby forming the optical adjustment layer 3. Note that epoxy acrylate having a bisaryl fluorene backbone includes the same benzene rings as those of the bisphenol A-type polycarbonate resin of the body. The structure of the epoxy acrylate having a bisaryl fluorene backbone that was used is shown in FIG. 6(b).

The diffraction efficiency of the diffractive optical element 101 produced through the above steps was measured. Using a white light source and a color filter (R: 640 nm, G: 540 nm, B: 440 nm), the maximum luminance at a point of convergence corresponding to each order of diffraction when light beams of the respective wavelengths were transmitted through the diffractive optical element 21 was measured by using a 3D micro-measurement apparatus (manufactured by Mitaka Kohki Co., Ltd.), and calculated from an equation as follows.

Note that, in the following Examples and Comparative Examples, no higher-order diffracted light was detected that was $3^{rd}$ order diffracted light or above.

[Eq. 4]

$$(1^{st} \text{ order diffraction efficiency}) = \frac{(\text{luminance of } 0^{th} \text{ order diffracted light})}{\left\{\begin{pmatrix} \text{luminance of } 0^{th} \text{ order diffracted light} + \\ \text{luminance of } 1^{st} \text{ order diffracted light} + \\ \text{luminance of } 2^{nd} \text{ order diffracted light} \end{pmatrix}\right\}} \quad (4)$$

The $1^{st}$ order diffraction efficiency of the diffractive optical element 101 of the present Example was 87% or more at all wavelengths. Note that a diffractive optical element can be regarded as having a high converging ability if its $1^{st}$ order diffraction efficiency is 85% or more.

Furthermore, the diffractive optical element 101 was cut in a cross section extending through the optical axis, and the border portion between the body 1 and the optical adjustment layer 3 was observed with an optical microscope, which revealed no change or degradation of the diffraction grating due to interaction between materials.

Moreover, in order to evaluate tolerance of thermal stress due to temperature changes, a thermal cycle test mocking a severe environment of use was performed. Specifically, the diffractive optical element 101 was placed in a thermal cycling apparatus (TSE-11-A manufactured by ESPEC CORP.), and 100 cycles of thermal cycling from −30° C. to 80° C. were performed for 30 minutes each, which revealed no peeling between the body 1 and the optical adjustment layer 3.

Example 2

A diffractive optical element 102 having the structure shown in FIG. 4 was produced by the following method.

First, the bisphenol A-type polycarbonate resin used in Example 1 (d-line refractive index: 1.585; Abbe number: 28; SP value: 9.8 $[cal/cm^3]^{1/2}$ FIG. 2(1a)) was injection-molded, thus producing a body 1 having an annular diffraction grating 2 with a depth d of 15 μm on one face, in which the foot of the diffraction grating had an aspherical envelope. The effective radius of the lens portion was 0.828 mm; the number of rings was 29; the pitch of the smallest ring was 14 μm; and the diffraction surface had a paraxial R (radius of curvature) of −1.0144 mm.

Next, a composite material to become the raw material of the optical adjustment layer 3' was prepared as follows. As the second resin of the matrix 5, a mixture containing an acrylate resin whose main component was acrylate resin A (pentaerythritol acrylate (FIG. 6(c)) lacking benzene rings, SP value 11.5 $[cal/cm^3]^{1/2}$) and epoxy acrylate resin D having the same bisphenol A structure and benzene rings as those of the body 1 (SP value 12.1 $[cal/cm^3]^{1/2}$, FIG. 6(a)) at a weight ratio of 3:1 was used. To this mixture, 2-propanol (IPA, SP value 11.5 $[cal/cm^3]^{1/2}$) was added as a solvent, and zirconium oxide (Abbe number: 35) having an effective particle size of 6 nm was dispersed in the mixture so that its weight ratio in the total solid content excluding the dispersion medium, i.e., IPA, was 56 weight %.

The optical characteristics of this composite material after drying and curing were as follows: the d line refractive index was 1.623; the Abbe number was 43; and the transmittance of a light beam with a wavelength of 400 to 700 nm was 90% or more (film thickness: 30 μm).

By using a dispenser, 0.4 μL of this composite material was dropped on the body 1, and after being dried with a vacuum drier (25° C.; internal pressure of the vacuum drier: 1300 Pa; 3 hours), it was placed on a mold (a stainless steel-type alloy with a nickel plating film formed on its surface), and from the rear face (the face opposite to the face on which the composite material was dropped) of the body 1, ultraviolet irradiation (illuminance: 120 mW/cm$^2$; cumulative light amount: 4000 mJ/cm$^2$) was performed, thus curing the acrylate resin, and thereafter, it was released from the mold, and formed into the optical adjustment layer 3'. Note that the optical adjustment layer 3' was formed so that its surface configuration matched the aspherical shape along the envelope shape of the foot of the diffraction grating 2. Moreover, the optical adjustment layer 3' was formed so that its thickness t was 30 μm at the thickest portion (i.e., the portion corresponding to the deepest portion of the diffractive optical element).

With a method similar to that of Example 1, the 1$^{st}$ order diffraction efficiency of the diffractive optical element of the present Example was calculated to be 91.5% or more at all wavelengths.

Moreover, a thermal cycle test similar to that of Example 1 was conducted by using this diffractive optical element, which revealed no peeling between the body 1 and the optical adjustment layer 3.

Example 3

A diffractive optical element having the same construction as that of Example 2 was produced by a method similar to that of Example 2. A difference from Example 2 was that it was produced so that ratio between the resins which were components of the optical adjustment layer was resin A: resin D=4:1.

With a method similar to that of Example 1, the 1$^{st}$ order diffraction efficiency of the diffractive optical element of the present Example was calculated to be 91.6% or more at all wavelengths.

Furthermore, the diffractive optical element of the present Example was cut in a cross section extending through the optical axis, and the border portion between the body and the optical adjustment layer was observed with an optical microscope, which revealed no change or degradation of the diffraction grating due to interaction between materials. Moreover, a thermal cycle test similar to that of Example 1 was conducted by using this diffractive optical element, which revealed no peeling between the body 1 and the optical adjustment layer 3.

Example 4

A diffractive optical element having the same construction as that of Example 2 was produced by a method similar to that of Example 2. A difference from Example 2 was that it was produced so that ratio between the resins which were components of the optical adjustment layer was resin A: resin D=3:2.

With a method similar to that of Example 1, the 1$^{st}$ order diffraction efficiency of the diffractive optical element of the present Example was calculated to be 88.6% or more at all wavelengths.

Furthermore, the diffractive optical element of the present Example was cut in a cross section extending through the optical axis, and the border portion between the body and the optical adjustment layer was observed with an optical microscope, which revealed no change or degradation of the diffraction grating due to interaction between materials. Moreover, a thermal cycle test similar to that of Example 1 was conducted by using this diffractive optical element, which revealed no peeling between the body 1 and the optical adjustment layer 3.

Comparative Example 1

As a Comparative Example, a diffractive optical element having the same structure as that of Example 2 was produced with a method similar to that of Example 2. A difference from Example 2 is that, as the resin which is a component of the optical adjustment layer, only pentaerythritol triacrylate lacking benzene rings (SP value 11.5 [cal/cm$^3$]$^{1/2}$) was used for production. The structure of pentaerythritol triacrylate is shown in FIG. 6(c).

With a method similar to that of Example 1, the 1$^{st}$ order diffraction efficiency of the diffractive optical element of this Comparative Example was calculated to be 90.6% at all wavelengths. Thus, optical characteristics providing sufficient usability as a diffractive optical element were obtained.

However, a thermal cycle test similar to that of Example 1 was performed by using this diffractive optical element to indicate that the optical adjustment layer 3 had peeled from the body 1.

Comparative Example 2

As a Comparative Example, a diffractive optical element having the same structure as that of Example 2 was produced with a method similar to that of Example 2. A difference from Example 2 is that, as the resin which is a component of the optical adjustment layer, only a bisphenol-A ethylene oxide adduct diacrylate having the same unit molecular structure and benzene rings as those of the body 1 (Light Acrylate BP-4EA: manufactured by KYOEISHA CHEMICAL Co., LTD, SP value 10.2 [cal/cm$^3$]$^{1/2}$) was used for production. However, the difference in solubility parameter value between this resin and the body polycarbonate is 0.2. The structure of the bisphenol-A ethylene oxide adduct diacrylate is shown in FIG. 6(d).

The diffractive optical element produced was cut in a cross section extending through the optical axis, and the border portion between the body and the optical adjustment layer was observed with an optical microscope, which revealed deformation of the diffraction grating shape as shown in FIG. 8, due to interaction between materials. Since there was significant deformation of the diffraction grating shape, diffracted light would not converge, and therefore it was impossible to measure a diffraction efficiency.

Comparative Example 3

As a Comparative Example, a diffractive optical element having the same construction as that of Example 2 was produced with a method similar to that of Example 2. A difference from Example 2 is that, as the resin which is a component of the optical adjustment layer, only acrylate resin A lacking benzene rings was used for production.

With a method similar to that of Example 1, the 1$^{st}$ order diffraction efficiency of the diffractive optical element produced was calculated to be 89% at all wavelengths. Thus, optical characteristics providing sufficient usability as a diffractive optical element were obtained.

However, a thermal cycle test similar to that of Example 1 was performed by using this diffractive optical element to indicate that the optical adjustment layer 3 had peeled from the body 1.

Figure 6:
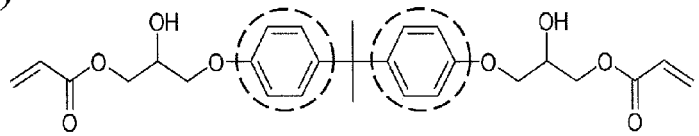
FIG. 6 (a) to (d) are diagrams showing structures of resins used in Examples and Comparative Examples.
Figure 6:
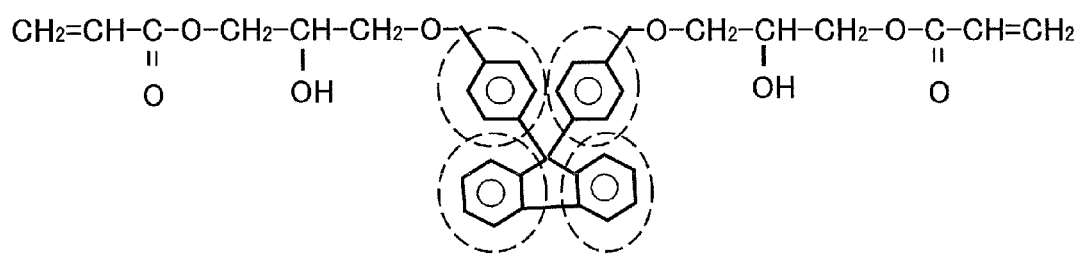
Figure 6:
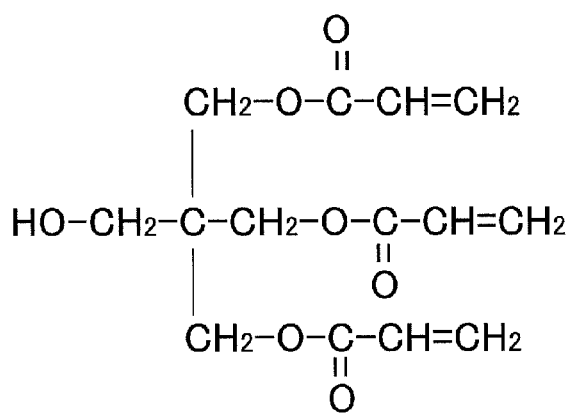
Figure 6:
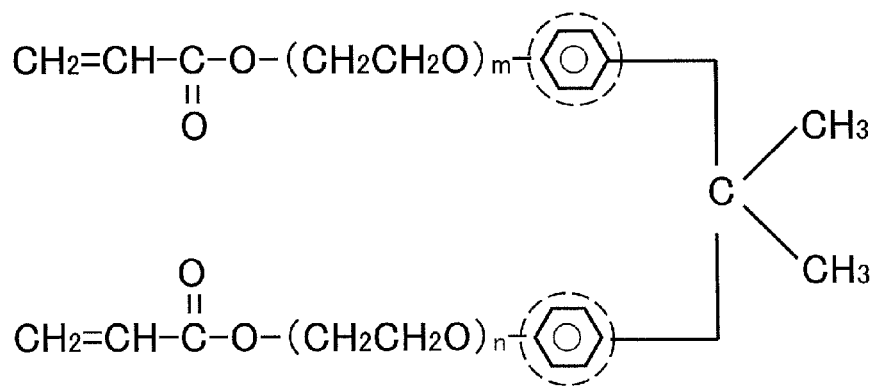

Table 1 summarizes characteristics of the first resins and the second resins used for the Examples and Comparative Examples, 1$^{st}$ order diffraction efficiencies, and thermal cycle test results. In FIG. 6, in the structures of the first resins and the second resins used in the Examples and Comparative Examples, benzene rings are shown encircled with broken lines.

TABLE 1

| | unit molecular structure of first resin (body)/ benzene rings are included or not | unit molecular structure of resin contained in second resin (optical adjustment layer)/ benzene rings are included or not | SP value difference between first resin and second resin | 1$^{st}$ order diffraction efficiency | thermal cycle test result (after 100 cycles) |
|---|---|---|---|---|---|
| Example 1 | bisphenol A structure/ YES | phenol structure/ YES | 1.4 | 87% | no peeling |
| Example 2 | bisphenol A structure/ YES | bisphenol A structure/ YES | 1.9 | 91.5% | no peeling |
| Example 3 | bisphenol A structure/ YES | bisphenol A structure/ YES | 1.8 | 91.6% | no peeling |
| Example 4 | bisphenol A structure/ YES | bisphenol A structure/YES | 1.94 | 88.6% | no peeling |
| Comparative Example 1 | bisphenol A structure/ YES | pentaerythritol structure/ NO | 1.7 | 90.6% | peeling occurred |
| Comparative Example 2 | bisphenol A structure/ YES | bisphenol A structure/ YES | 0.4 | not measurable | — |
| Comparative Example 3 | bisphenol A structure/ YES | alicyclic structure/ NO | 1.7 | 89% | peeling occurred |

As shown in Table 1, in Examples 1 to 4, the resins contained in the body and the optical adjustment layer have benzene rings, and no peeling of the optical adjustment layer was observed in the thermal cycle test. This is presumably because there is interaction between the two resins due to the benzene rings, so that the closeness of contact between the optical adjustment layer and the body was improved.

On the other hand, in Comparative Examples 1 and 3, such a high closeness of contact was not obtained presumably because the resin contained in the optical adjustment layer lacked benzene rings, thus resulting in peeling of the optical adjustment layer in the thermal cycle test.

Moreover, in Examples 1 to 4, the difference in solubility parameter value between the resins contained in the body and the optical adjustment layer is 0.8 $[cal/cm^3]^{1/2}$ or more, thus providing high 1$^{st}$ order diffraction efficiencies. On the other hand, in Comparative Example 2, the diffraction grating was deformed presumably because the difference in solubility parameter value between the resins contained in the body and the optical adjustment layer was smaller than 0.8 $[cal/cm^3]^{1/2}$.

These results indicate that, when the first resin contained in the first optical material composing the body and the second resin contained in the second optical material each have a benzene ring and the difference between the solubility parameter of the first resin and the solubility parameter of the second resin is 0.8 $[cal/cm^3]^{1/2}$ or more, a diffractive optical element is obtained which has excellent optical characteristics and in which the optical adjustment layer will not peel from the body even in a severe environment of use.

INDUSTRIAL APPLICABILITY

A diffractive optical element according to the present invention can be used as a camera lens, a spatial low-pass filter, a polarizing hologram, and the like. In particular, it is suitably used as an optical element of an apparatus which is disposed in a place of drastic changes in ambient temperature or vibrations.

REFERENCE SIGNS LIST

1, 101 body
2, 102 diffraction grating
3, 3', 103 optical adjustment layer
101a altered-refractive index layer
101, 102, 111, 112 diffractive optical element

The invention claimed is:
1. A diffractive optical element comprising:
a body being composed of a first optical material containing a first resin, and having a diffraction grating on a surface thereof; and
an optical adjustment layer being composed of a second optical material containing a second resin, and provided on the body so as to cover the diffraction grating, wherein,
a difference between a solubility parameter of the first resin and a solubility parameter of the second resin is 0.8$[cal/cm^3]^{1/2}$ or more;
the first resin and the second resin each have a benzene ring; and at least one of the first resin and the second resin has the following bisphenol A structure

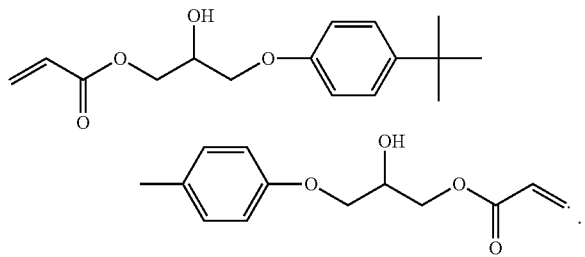

2. The diffractive optical element of claim 1, wherein the second resin is a thermosetting resin or an energy-curing resin.

3. The diffractive optical element of claim 2, wherein the second resin has an OH group.

4. The diffractive optical element of claim 3, wherein a refractive index of the first optical material is smaller than a refractive index of the second optical material, and a wavelength dispersion of the refractive index of the first optical material is greater than a wavelength dispersion of the refractive index of the second optical material.

5. The diffractive optical element of claim 4, wherein the second optical material further contains inorganic particles, the inorganic particles being dispersed in the second resin.

6. The diffractive optical element of claim 5, wherein, as a main component, the inorganic particles contain at least one selected from the group consisting of zirconium oxide, yttrium oxide, lanthanum oxide, hafnium oxide, scandium oxide, alumina, and silica.

7. The diffractive optical element of claim 6, wherein the inorganic particles have an effective particle size of no less than 1 nm and no more than 100 nm.

8. The diffractive optical element of claim 6, wherein the first resin has the following bisphenol A structure;

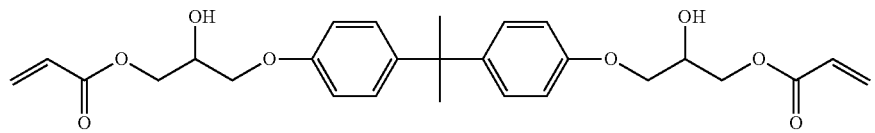 [SMILES: C=CC(=O)OCC(O)COc1ccc(C(C)(C)c2ccc(OCC(O)COC(=O)C=C)cc2)cc1]

and the second resin includes a bisphenol A structure as a portion of a unit molecular structure thereof.

9. The diffractive optical element of claim 6, wherein the first resin has the following bisphenol A structure;

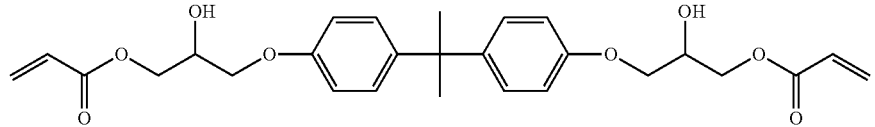 [SMILES: C=CC(=O)OCC(O)COc1ccc(C(C)(C)c2ccc(OCC(O)COC(=O)C=C)cc2)cc1]

and the second resin includes a phenol structure as a portion of a unit molecular structure thereof.

* * * * *